United States Patent [19]
Pao

[11] Patent Number: 6,142,699
[45] Date of Patent: Nov. 7, 2000

[54] TELESCOPIC ROD

[75] Inventor: Boris Pao, Taichung, Taiwan

[73] Assignee: Asia Link Co., Ltd., Taichung, Taiwan

[21] Appl. No.: 09/062,676

[22] Filed: Apr. 21, 1998

[51] Int. Cl.[7] ..................................................... F16B 2/18
[52] U.S. Cl. ..................... 403/109.5; 403/110; 403/374.5
[58] Field of Search ............................. 403/109.1, 109.2, 403/109.5, 110, 374.5, 374.2, 374.1, 377, 373, 104

[56] References Cited

U.S. PATENT DOCUMENTS

| | | |
|---|---|---|
| 593,373 | 11/1897 | Estell . |
| 918,579 | 4/1909 | Murch . |
| 1,391,495 | 9/1921 | Parsons . |
| 1,918,519 | 7/1933 | Clements . |
| 2,315,516 | 4/1943 | Gray . |
| 2,710,207 | 6/1955 | Mueller . |
| 3,072,425 | 1/1963 | Nichols . |
| 3,210,035 | 10/1965 | Vincens . |
| 3,456,662 | 7/1969 | Weber . |
| 3,849,008 | 11/1974 | Boucher et al. ..................... 403/104 X |
| 4,174,900 | 11/1979 | Ina ..................... 248/163.1 X |
| 4,435,105 | 3/1984 | Rampley ............................. 409/109 X |
| 4,596,484 | 6/1986 | Nakatani ............................. 403/104 X |
| 4,761,092 | 8/1988 | Nakatani ............................. 403/104 X |
| 4,911,034 | 3/1990 | Kulczyk et al. ..................... 74/492 X |
| 5,449,104 | 9/1995 | Parsons et al. ..................... 224/245 X |
| 5,617,980 | 4/1997 | Parsons et al. ..................... 224/251 X |
| 5,694,695 | 12/1997 | Lund ................................. 30/296.1 X |
| 5,702,198 | 12/1997 | Kuo ........................................ 403/377 |
| 5,707,167 | 1/1998 | Battocchio ........................... 403/109 X |

*Primary Examiner*—Harry C. Kim
*Attorney, Agent, or Firm*—Rosenberg, Klein & Lee

[57] ABSTRACT

A telescopic rod including a latch lock, an outer tube, a collar and an inner tube. The latch lock is formed with a fitting hole. A locating block is formed on inner side of the fitting hole. The outer tube is fitted into the fitting hole of the latch lock. An outer edge of one end of the outer tube is formed with an axial recess. The locating block is inserted into the recess of the outer tube and the open side of the collar, preventing the collar from being rotated so as to enhance locking effect.

5 Claims, 7 Drawing Sheets

TELESCOPIC ROD

BACKGROUND OF THE INVENTION

The present invention relates to a telescopic rod, and more particularly to a telescopic rod with good locking effect.

FIGS. 7 to 9 show an existing telescopic rod 8 including an outer tube 81. One end of the outer tube 81 is formed with a rectangular through hole 811. A C-shaped collar 82 is fitted in the outer tube 81. The collar 82 has a flange 821 at one end. The collar 82 serves to protect an inner tube 83 from being scraped by the outer tube 81. In addition, a latch lock 84 is fitted around the outer tube 81. A pressing lever 85 is pivotally disposed on one side of the latch lock 84 for pressing a pressing block 86 positioned in the through hole 811. The telescopic rod 8 is connected with an appliance (such as a microphone) for increasing length. Also, it is often necessary to rotate the telescopic rod by a certain angle to meet the using angle of a user. Therefore, the outer tube 81 or inner tube 83 is necessary to be rotated through a certain angle. This will make the collar 82 biased to one side. Under such circumstance, the pressing block 86 will press the collar 82 and fail to totally abut against the inner tube 83. Accordingly, the inner tube 83 may slip relative to the outer tube 81 and the latch lock 84 will lose its function.

FIGS. 10 and 11 show another type of telescopic rod 9 in which the walls of the outer and inner tubes 91, 92 are pressed with two guide channels 93, whereby the outer and inner tubes 91, 92 are prevented from rotating relative to each other. The collar 94 is formed with a bent section 941 on one side in accordance with the guide channels 93, whereby the collar 94 will not be rotated. The pressing block 95 has a projecting section 951 in accordance with the guide channels 93 for enhancing tightness. However, in manufacturing, such telescopic rod 9 still has the following shortcomings:

The outer and inner tubes 91, 92 must be pressed with the guide channels 93. Due to limitation of manufacturing technique and cost, the cost for the mold will be relatively high in the case that steel tube (or iron tube) with higher hardness is used as the material. Therefore, softer aluminum tube is selectively used as the material for reducing the cost. However, when suffering heavy load, the aluminum tends to be bent. In addition, after pressed by the pressing block 95, the aluminum tube is subject to deformation. This will make the pressing block unable to tightly clamp the inner tube.

SUMMARY OF THE INVENTION

It is therefore a primary object of the present invention to provide a telescopic rod in which a locating block of the latch lock is inserted into a recess of the outer tube and an open side of the collar, whereby the collar is prevented from rotating and the locking effect is enhanced.

It is a further object of the present invention to provide the above telescopic rod which is manufactured and assembled in an easy manner.

The present invention can be best understood through the following description and accompanying drawings, wherein:

DETAILED DESCRIPTION OF THE PREFERRED EMBODIMENTS

Figure 1:
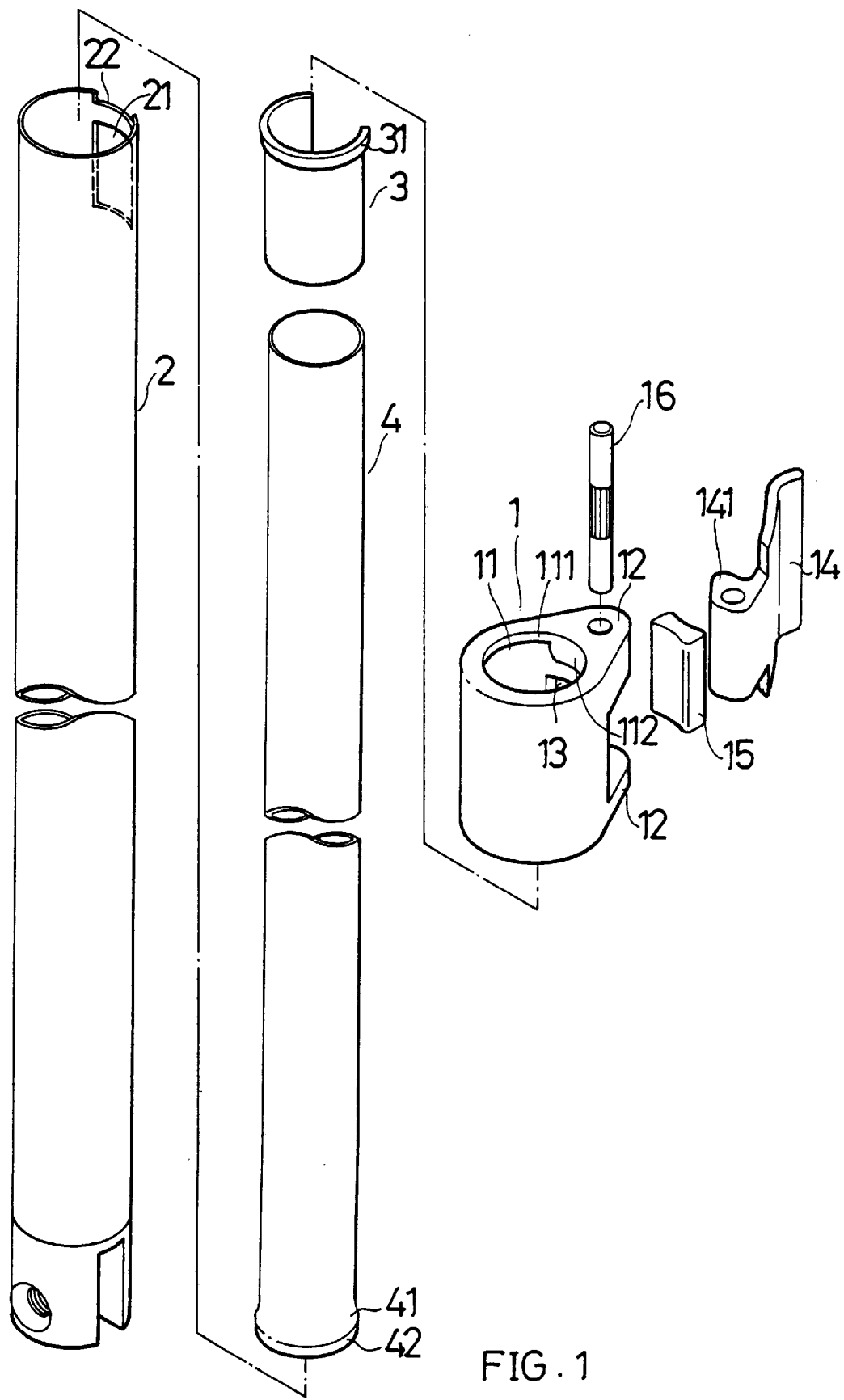
FIG. 1 is a perspective exploded view of a first embodiment of the present invention.
Figure 2:
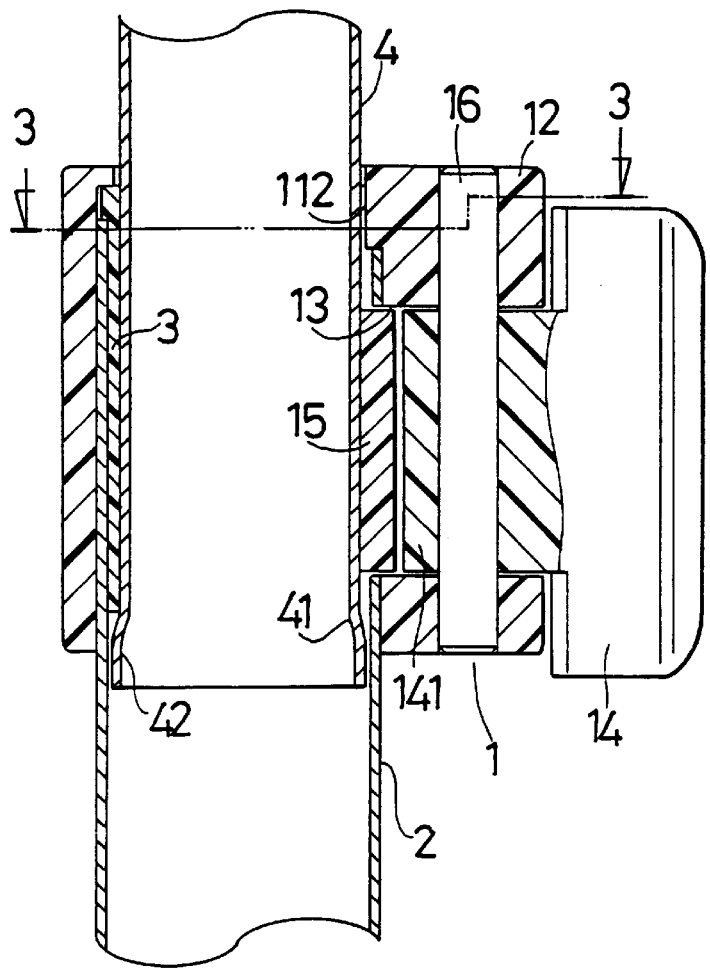
FIG. 2 is a longitudinal sectional view of the first embodiment of the present invention.
Figure 3:
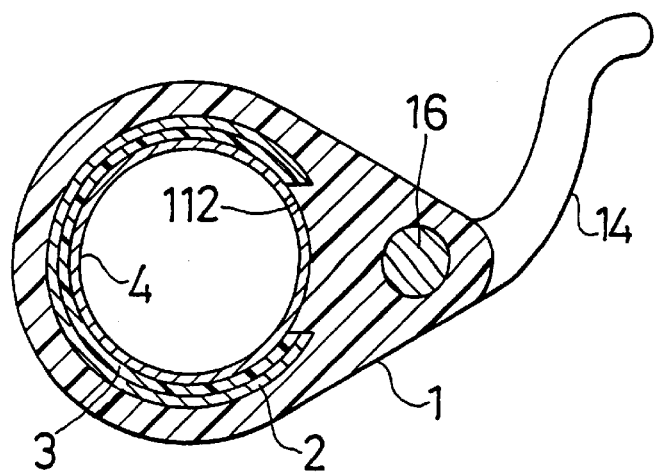
FIG. 3 is a cross-sectional view along line 3—3 of the first embodiment of the present invention shown in FIG. 2.

Please refer to FIGS. 1 to 3. The telescopic rod of the present invention includes:

a latch lock 1 formed with a fitting through hole 11, a stopper flange 111 being formed on inner edge of one end of the fitting hole 11, an inner side of the stopper flange 111 being disposed with a locating block 112 projecting from inner wall of the fitting hole 11, the latch lock 1 being disposed with two pivot sections 12 at two ends on one side, a rectangular restricting window 13 being formed between the pivot sections 12 and communicated with the fitting hole 11, a pressing block 15 being positioned in the restricting window 13, a pressing lever 14 being pivotally connected with the pivot section 12 by pin 16, one side of the pressing lever 14 being formed with a projecting pressing section 141 for pressing the pressing block 15. As shown in FIG. 1, the eccentrically shaped pressing section 141 makes contact with the pressing block 15 when the pressing lever 14 is rotated about pin 16.

an outer tube 2 fitted into the fitting hole 11 of the latch lock 1, one end of the outer tube 2 being formed with a rectangular through hole 21 for the pressing block 15 to pass therethrough, an outer edge of the end of the outer tube 2 being formed with a recess 22 for engaging with the locating block 112;

a collar 3 having a C-shaped cross-section and fitted in the outer tube 2, the locating block 112 being inserted into an open side of the collar 3, an outer edge of one end of the collar 3 being formed with a flange 31 for abutting against the stopper flange 111; and an inner tube 4 fitted into the collar 3, one end of the inner tube 4 distal from the flange 31 being formed with a trumpet opening 41, a straight section 42 being formed on an edge of the trumpet opening 41 parallel to the wall of the inner tube 4.

Referring to FIG. 1, when assembled, the inner tube 4 is first fitted into the collar 3 and then the collar 3 is fitted into the outer tube 2 with the through hole 21 aligned with the opening side of the collar 3 and with the end face of the outer tube 2 abutting against the flange 31 of the collar 3. Then the latch lock 1 is fitted around the outer tube 2 with the locating block 112 aligned with the recess 22. Finally, the pressing block 15 is positioned in the restricting window 13 and the pressing lever 14 is pivotally connected with the pivot sections 12. According to the above assembling procedure, only the alignment operation is added and no troublesome step is necessary. Also, in manufacturing, only the mold is slightly different so that the cost will not be increased. Moreover, the outer and inner tubes 2, 4 are both made of steel tubes (or iron tubes) having good strength so that the telescopic rod is not subject to bending. The locating block 112 is inserted into the open side of the collar 3 and the recess 22 of the outer tube 2, whereby these three members are prevented from rotating relative to each other. However, the inner tube 4 can be freely rotated to meet the using angle of a user. Especially, when pressed by the pressing lever 14, the pressing block 15 is free from any obstacle so that the inner tube 4 can be effectively tightly locked. In addition, the straight section of the trumpet opening 41 contacts with the inner wall of the outer tube 2 to enhance the fitting effect and distribute the wearing between the outer and inner tubes 2, 4. Therefore, the using life is prolonged.

Alternatively, the recess 22 can be integrally formed with the through hole 21 for facilitating the manufacturing. However, the width of the recess 22 must be less than that of the through hole 21 so as to prevent the pressing block 15 from axially slipping out.

Figure 4:
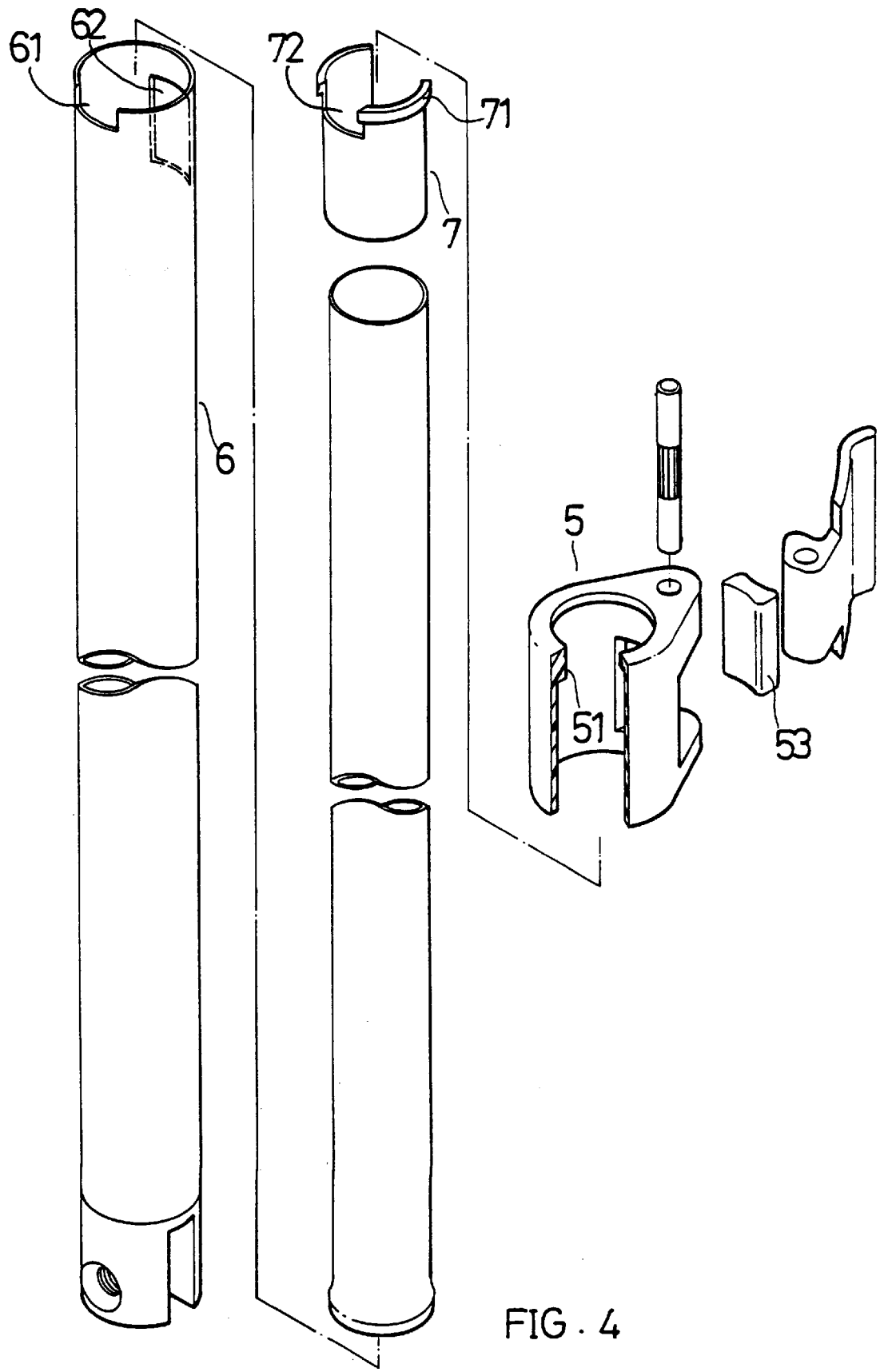
FIG. 4 is a perspective exploded view of a second embodiment of the present invention.
Figure 5:
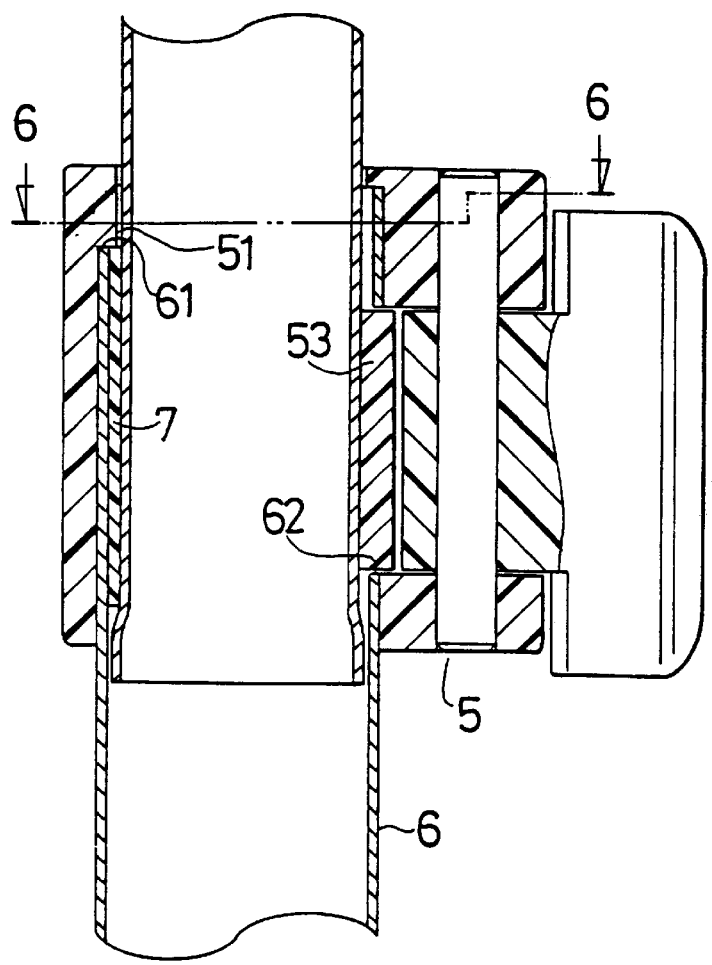
FIG. 5 is a longitudinal sectional view of the second embodiment of the present invention.
Figure 6:
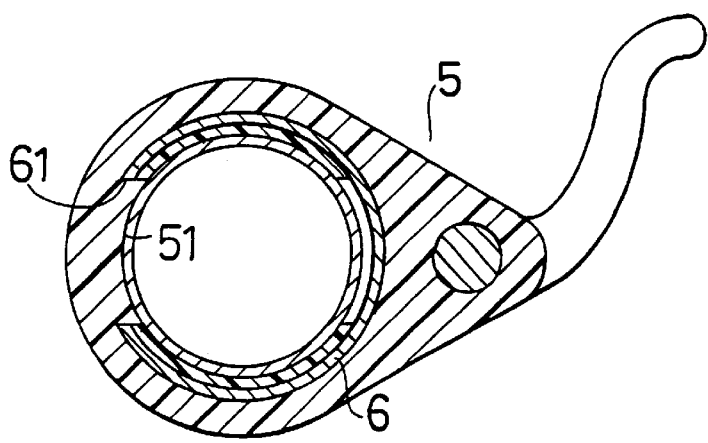
FIG. 6 is a cross-sectional view along line 6—6 of the second embodiment of the present invention shown in FIG. 5.
Figure 7:
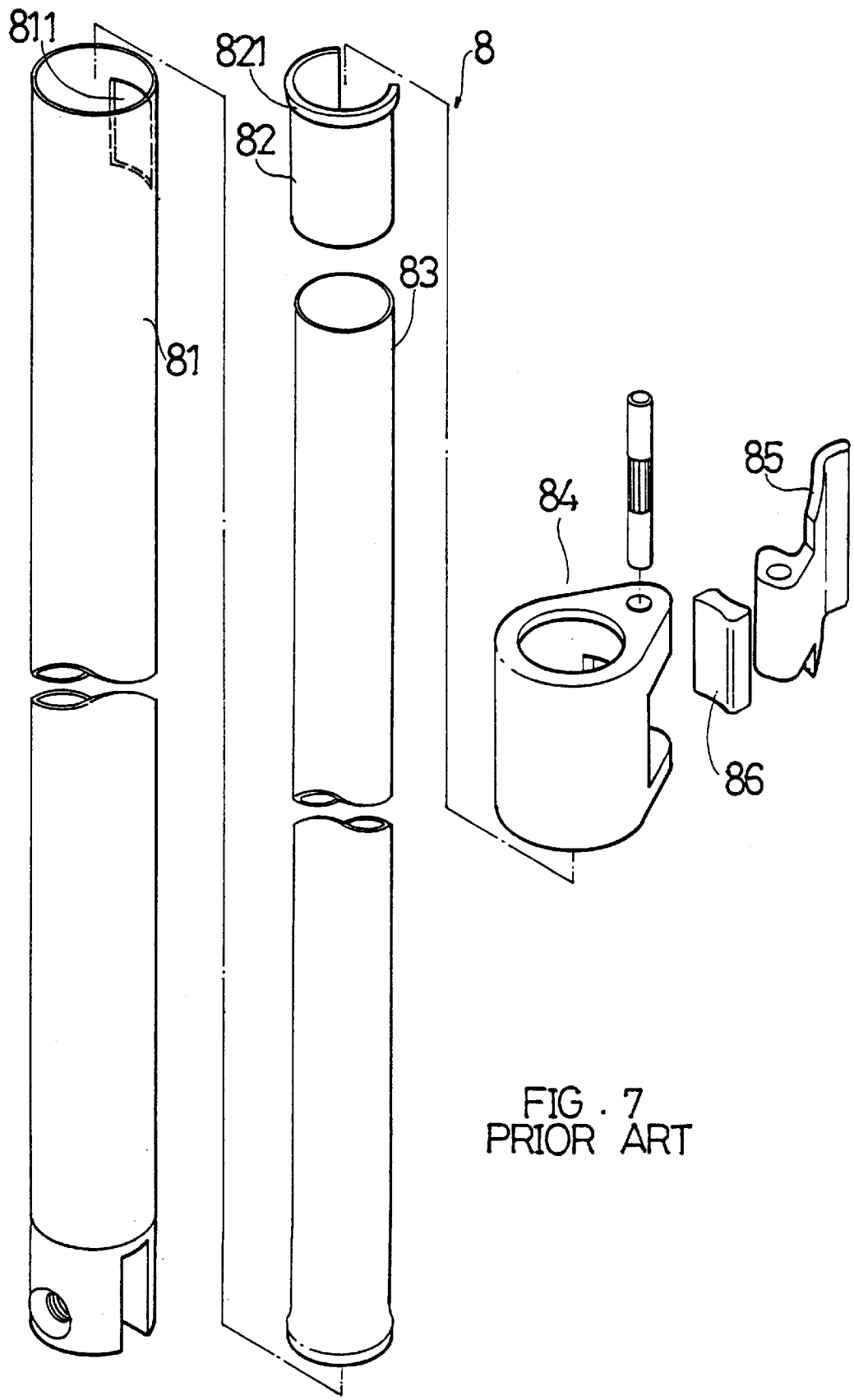
FIG. 7 is a perspective exploded view of a conventional telescopic rod.
Figure 8:
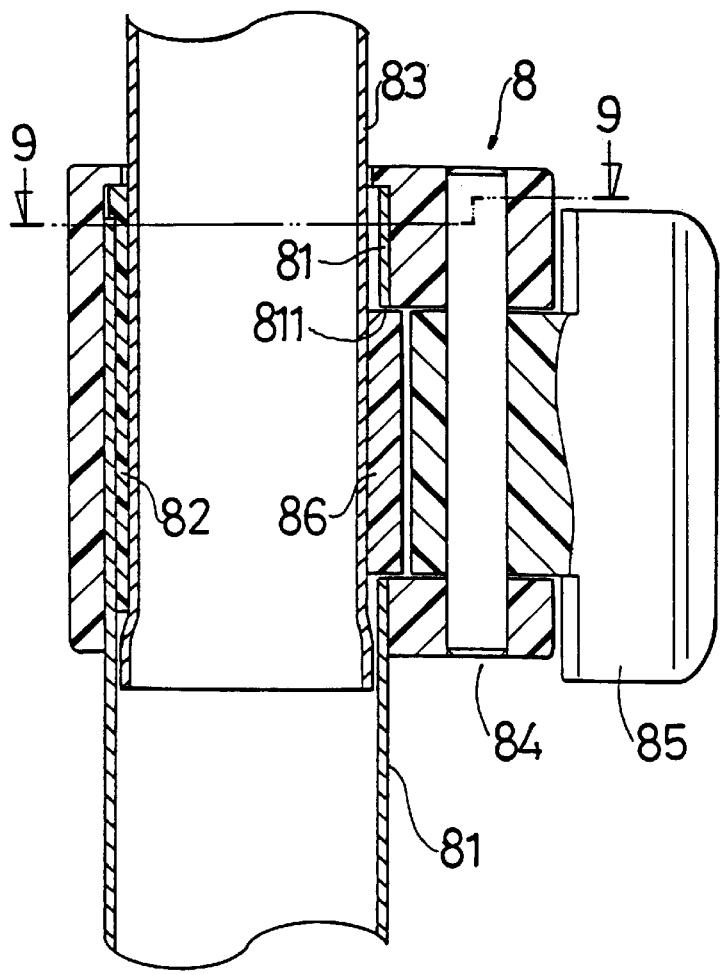
FIG. 8 is a longitudinal sectional view of the conventional telescopic rod of FIG. 7.
Figure 9:
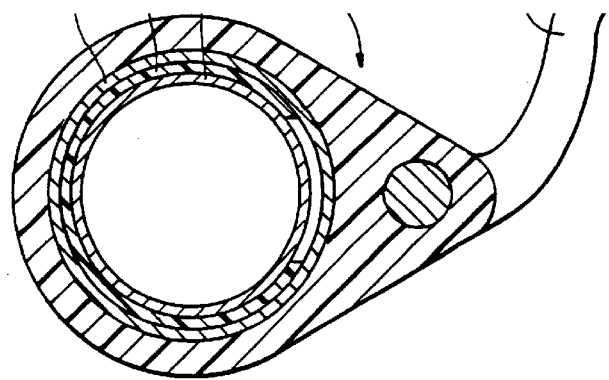
FIG. 9 is a cross-sectional view along line 9—9 of the conventional telescopic rod of FIG. 7.
Figure 10:
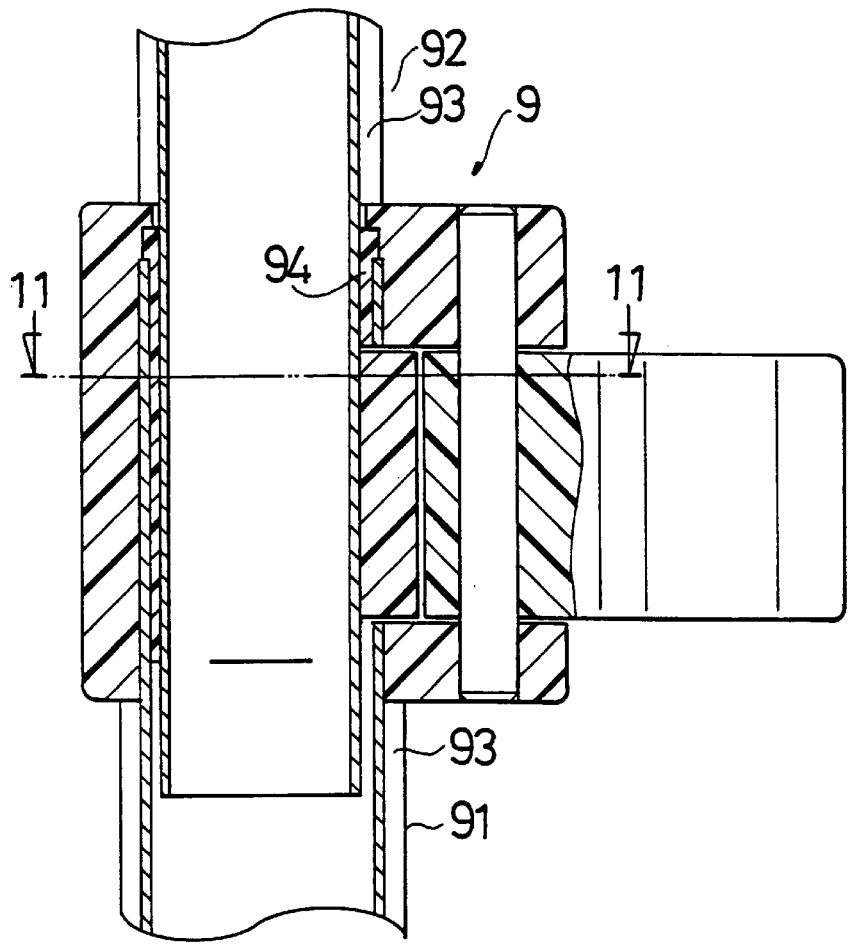
FIG. 10 is a longitudinal sectional view of another type of conventional telescopic rod.
Figure 11:
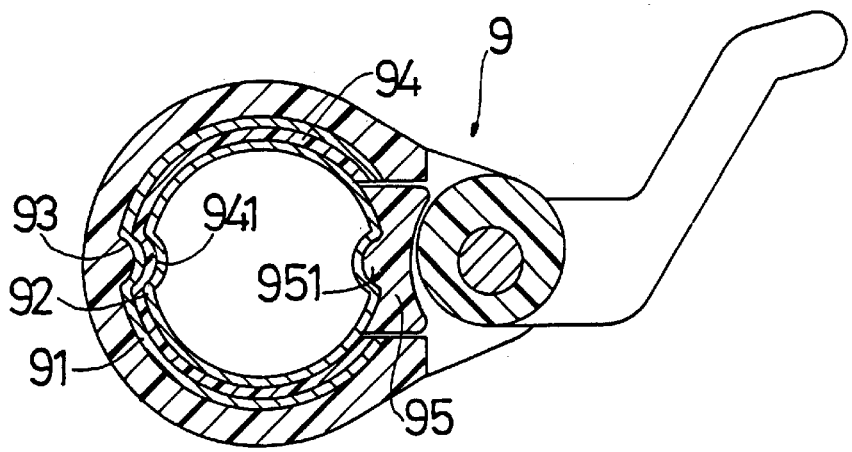
FIG. 11 is a cross-sectional view along line 11—11 of the conventional telescopic rod of FIG. 10.

FIGS. 4 to 6 show a second embodiment of the present invention, in which the locating block 51 of the latch lock 5 is disposed on one side opposite to the restricting window 52 and the recess 61 of the outer tube 6 is formed on one side opposite to the through hole 62. Also, the collar 7 is formed with a recess 72 on the flange 71 opposite to the open side. The locating block 51 is inserted into the recess 61 and the recess 72 to simultaneously restrict the outer tube 6 and the collar 7. Accordingly, the second embodiment also can achieve a good locating effect. In addition, the locating block 51 is positioned opposite to the pressing block 53 so as to evenly distribute the rotating force. Therefore, the locating effect for the collar 7 is better.

It is to be understood that the above description and drawings are only used for illustrating some embodiments of the present invention, not intended to limit the scope thereof. Any variation and derivation from the above description and drawings should be included in the scope of the present invention.

What is claimed is:

1. A telescopic rod comprising:

a latch lock formed with a fitting through hole, a stopper flange being formed on an inner edge of one end of said fitting through hole, an inner side of said stopper flange being disposed with a locating block projecting from an inner wall of the fitting through hole, a restricting window being formed at a middle portion of one side of said latch lock, two pivot sections being disposed on outer sides of two ends of said restricting window, a pressing block being positioned in said restricting window, a pressing lever being pivotally connected with said two pivot sections, a first side of said pressing lever being formed with a projecting pressing section for pressing the pressing blocks allowing an operator to selectively engage said pressing block;

an outer tube fitted into said fitting through hole of said latch lock, a first end of said outer tube being formed with a through hole for the pressing block to pass therethrough, an outer edge of said first end of said outer tube being formed with a recess for releasable engagement with said locating block;

a collar having a C-shaped cross-section and fitted in said outer tube, said locating block being inserted into an open side of said collar to restrict rotational movement of said collar, an outer edge of a first end of said collar being formed with a flange for abutting against said stopper flange; and, an inner tube fitted into the collar.

2. A telescopic rod as claimed in claim 1, wherein the locating block is positioned on the same side as the restricting window.

3. A telescopic rod as claimed in claim 1, wherein the locating block is positioned on one side opposite to the restricting window.

4. A telescopic rod as claimed in claim 1, wherein said recess is formed in the outer tube in vertical alignment with the through hole.

5. A telescopic rod as claimed in claim 1, wherein one end of the inner tube distal from the flange of the collar is formed with a trumpet opening, a straight section being formed on an edge of the trumpet opening parallel to a wall of the inner tube.

* * * * *